(12) United States Patent
Fahrbach et al.

(10) Patent No.: US 6,629,653 B2
(45) Date of Patent: *Oct. 7, 2003

(54) PROCESS AND DEVICE FOR THE SEPARATION OF VISCOPLASTIC MATERIALS SUCH AS PLASTICS FROM MATERIALS SUCH AS PAPER WHICH CAN BE DEFIBRATED BY MECHANICAL ACTION

(75) Inventors: Gerhard Fahrbach, Plankstadt (DE); Heinz Reiner Schnettler, Arnsberg (DE)

(73) Assignee: "Der Gruene Punkt" Duales System Deutschland Aktiengesellschaft, Cologne (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 160 days.

(21) Appl. No.: 09/147,185
(22) PCT Filed: Apr. 17, 1997
(86) PCT No.: PCT/EP97/01922
§ 371 (c)(1),
(2), (4) Date: Feb. 19, 1999
(87) PCT Pub. No.: WO97/40940
PCT Pub. Date: Nov. 6, 1997

(65) Prior Publication Data
US 2002/0079250 A1 Jun. 27, 2002

(30) Foreign Application Priority Data
Apr. 25, 1996 (DE) .......................... 196 16 623

(51) Int. Cl.$^7$ .............................................. B02C 17/02
(52) U.S. Cl. ................ 241/24.21; 241/89.3; 241/24.18; 241/24.19; 241/24.28; 241/24.29; 209/300
(58) Field of Search ............................. 209/4, 273, 300, 209/268, 270, 293, 294, 296, 385, 389; 241/89.3, 24.19, 24.18, 24.21, 24.28, 24.29, 24.1

(56) References Cited

U.S. PATENT DOCUMENTS

| | | | | | |
|---|---|---|---|---|---|
| 2,474,314 | A | * | 6/1949 | Koehne ................... | 241/24.19 |
| 2,729,856 | A | * | 1/1956 | Horton et al. ........... | 241/24.19 |
| 3,013,735 | A | * | 12/1961 | Janson .................... | 241/24.19 |
| 3,912,622 | A | * | 10/1975 | Bolton, III et al. ........ | 209/273 |
| 3,970,548 | A | * | 7/1976 | Seifert et al. ............... | 209/240 |
| 4,072,273 | A | * | 2/1978 | Reiniger ..................... | 241/24 |
| 4,160,722 | A | * | 7/1979 | Marsh .......................... | 209/4 |
| 4,245,999 | A | * | 1/1981 | Reiniger ......................... | 44/1 |
| 4,267,035 | A | * | 5/1981 | Martin ....................... | 209/273 |
| 4,382,559 | A | * | 5/1983 | Hellberg .................... | 241/79.3 |
| 4,426,921 | A | * | 1/1984 | Meinardus ................... | 99/519 |
| 4,440,635 | A | * | 4/1984 | Reiniger ........................ | 209/4 |
| 4,500,040 | A | * | 2/1985 | Steffens ....................... | 241/14 |
| 4,594,152 | A | * | 6/1986 | Gullichsen .................. | 209/273 |
| 4,615,767 | A | * | 10/1986 | Miers et al. ................... | 162/4 |
| 4,760,717 | A | * | 8/1988 | Ponziealli .................... | 68/181 |

(List continued on next page.)

FOREIGN PATENT DOCUMENTS

RU            2054073 C1     2/1996

*Primary Examiner*—Donald P. Walsh
*Assistant Examiner*—Daniel K Schlak
(74) *Attorney, Agent, or Firm*—Oblon, Spivak, McClelland, Maier & Neustadt, P.C.

(57) ABSTRACT

The invention relates to a process for separating tenaciously elastic materials such as plastics and rubber from materials tearing and/or defiberizing under high mechanical stress, particularly paper, and to a device for performing said process. The process is characterized in that the mixture of materials to be separated is subjected to high radial, axial and tangential acceleration forces, whereby a mass flow of shredded fibrous material and a mass flow of substantially unshredded plastics is withdrawn separately. The device for performing the process consists of a screen basket which is cylindrical or preferably polygonal in shape and has borings in its jacket to let the defiberized material pass through, a rotatable driving shaft being arranged coaxially inside the screen basket, with blades being attached to said driving shaft, preferably in rigid connection.

38 Claims, 1 Drawing Sheet

U.S. PATENT DOCUMENTS

| | | | | |
|---|---|---|---|---|
| 4,894,147 A | * | 1/1990 | Rajala | 209/273 |
| 4,913,806 A | * | 4/1990 | Hillstrom | 209/273 |
| 4,941,970 A | * | 7/1990 | Ahs | 209/234 |
| 4,961,844 A | * | 10/1990 | Ekholm et al. | 209/273 |
| 5,358,637 A | * | 10/1994 | Hutzler et al. | 210/415 |
| 5,443,213 A | * | 8/1995 | Aikawa | 209/273 |
| 5,597,075 A | * | 1/1997 | Iwashige et al. | 209/10 |
| 5,624,558 A | * | 4/1997 | Aaltonen et al. | 210/415 |
| 5,692,688 A | * | 12/1997 | Waitman et al. | 241/73 |
| 5,798,025 A | * | 8/1998 | Iwashige | 162/261 |
| 6,010,012 A | * | 1/2000 | Gero | 209/306 |
| 6,261,417 B1 | * | 7/2001 | Iwashige | 162/251 |
| 6,270,025 B1 | * | 8/2001 | Geigle et al. | 241/24.1 |

* cited by examiner

PROCESS AND DEVICE FOR THE SEPARATION OF VISCOPLASTIC MATERIALS SUCH AS PLASTICS FROM MATERIALS SUCH AS PAPER WHICH CAN BE DEFIBRATED BY MECHANICAL ACTION

FIELD OF THE INVENTION

The invention relates to a process and a device for the separation of materials which are tenaciously elastic at normal temperatuze, such as plastics and rubber, from other materials defiberizing under high mechanical stress, such as paper, cardboard, carton or other products containing cellulose fibers.

More specifically, in waste disposal and recovery of substances contained in the waste materials, the separation of plastics and paper represents a considerable problem. Such mixed waste containing both plastics and paper or other cellulose products arises in huge amounts. Thus, for example, the presorted plastic packages from the collections conducted by Duales System (Germany), and particularly the so-called mixed fraction, have a significant percentage of paper, including paper labels, erroneous classifications in sorting, and paper-plastic composite materials.

To date, the separation of plastics, rubber and other tenaciously elastic materials from materials containing cellulose fibers, such as paper, cardboard and carton has been effected using the wet separation process which works by extensive defiberization of the fiber matrix and subsequent separation resulting in at least two streams of material, namely, the cellulose-containing sludge having a high water content, and the water-insoluble plastics. This process requires a considerable input in energy and machinery. In the above case, the paper defiberization is performed in a wet-grinding mill, for example, and in the shredding procedure, water is added exceeding the weight of plastics and paper by a multiple. Here, in particular, a huge amount of energy is required to set the masses of water in motion. So-called friction separators are used to separate the arising sludge of fillers, contaminants or other substances from the plastics. In each case, the mass flow rich in fibers must be dehydrated using vibrating or bottom screens, for example. In addition, the water content is usually reduced by pressing such as chamber filter pressing; however, a water content as high as more than 50% still remains in the product. If the mass high in paper fibers cannot be utilized, which is the normal case with waste materials, the high water content either causes high costs for dumping or considerable expenditure for drying in case of thermal utilization of the waste materials. Similarly, the plastics must be dehydrated, particularly if they are high in foils as is the case, e.g., with the combination of the abundant polyethylene foils with paper, which is predominantly effected by means of mechanical dryers. To this end, modified centrifuges or whizzers are used. In some cases, thermal (after) drying may be required so that in total, the expenditure for separation causes considerable cost and is ecologically unfavorable due to the high input in energy.

Numerous investigations have been conducted in this field. As examples, there may be mentioned: Louis Jetten, Stoffliches Kunststoffrecycling und die Rolle des Wassers in Aufbereitungstechnik beim Verwerten von Kunststoffen, VDI-Verlag, Düsseldorf, 1993; and technological study: Stoffliches Kunststoffrecycling, Part 2, edited by EWvK, Entwicklungsgesellschaft für die Wiederverwertung von Kunststoffen, Wiesbaden, 1992.

Furthermore, processes for dry separation of paper and plastics operated utilizing electrostatic charging are already known. Here, separation using a gravity separator may be mentioned, which is described in DE 3,227,874 and DE 4,225,977, for example. This process involves considerable drawbacks. The charging material is required to meet quite specific preconditions regarding the geometrical dimensions. Also, the demands with respect to the drying level are very high. The operative input is considerable. Moreover, this process does not permit separation of non-positive and positive composite materials.

SUMMARY OF THE INVENTION

Therefore, it is the object of the invention to provide a process for the separation of tenaciously elastic materials such as plastics and rubber from materials defiberizing under high mechanical stress, such as paper, cardboard and carton, which is advantageous in ecological terms and simple in processing technology. For example, LDPE, HDPE, PP, polystyrene, PVC, PET, and ABS may be mentioned as plastics.

Surprisingly, it was found possible to separate tenaciously elastic materials such as plastics and rubber from fiber-containing materials such as paper in an essentially dry and technically simple fashion by impinging the mixture of plastics and fiber-containing material using high acceleration and impact forces, the fiber-containing material being ripped and/or defiberized by the action of said forces, discharging through the appropriate openings of a screen basket, while the non-defiberizing plastics remain in the interior of the casing and are removed in axial direction. The application of acceleration and impact forces or the use of a centrifuge in the dry separation of paper and plastics must be rated surprising because centrifuges have invariably been used for separating solid-liquid phases or liquid-liquid phases.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMRODIMENTS

Figure 1:
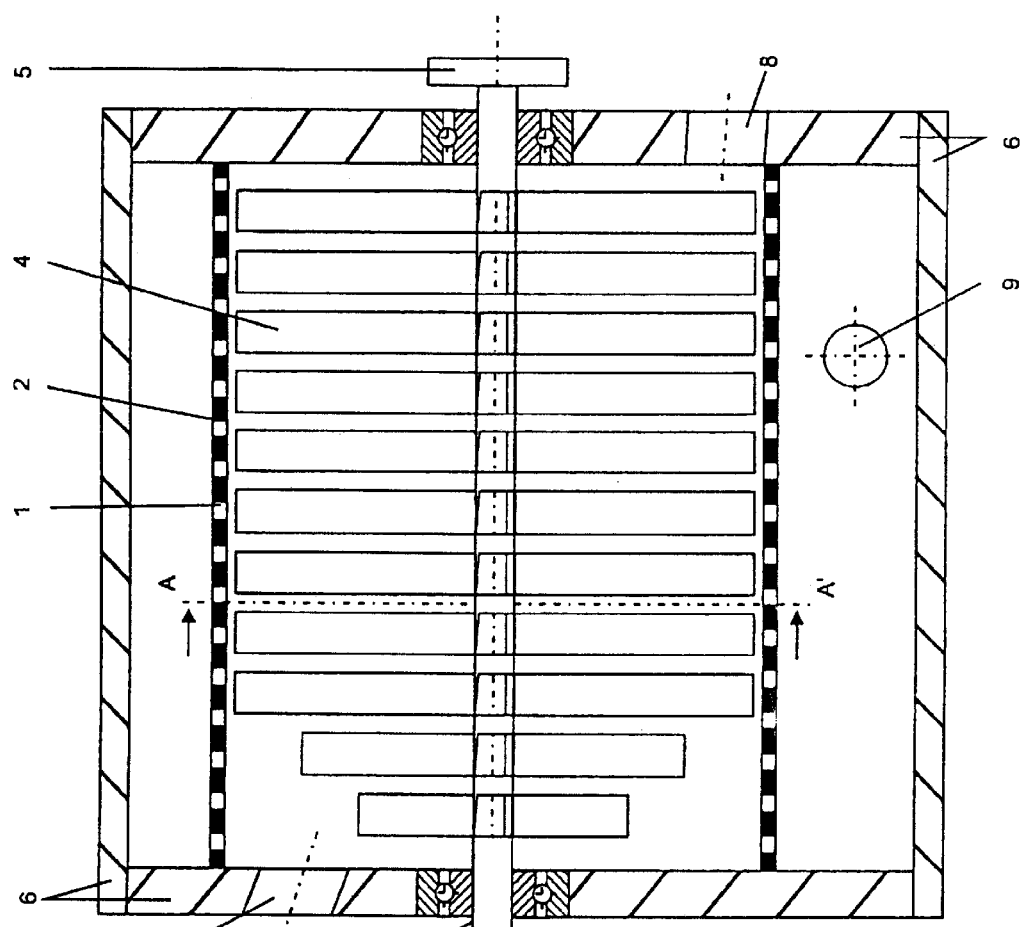
FIG. 1 shows a longitudinal section through a device for performing the present invention.

Thus, the invention is directed to a process for separating tenaciously elastic materials such as plastics and rubber from materials tearing and/or defiberizing under high mechanical stress, particularly paper but also other fibrous materials, which process is characterized in that the mixture of materials to be separated, preferably following previous shredding, is subjected to high acceleration forces in radial, axial and tangential directions.

Preferably, the material to be separated is pre-shredded to a size of ≦50 mm.

Furthermore, the invention is directed to a device for performing the process, consisting of a closed screen basket (1) which is cylindrical or preferably polygonal in shape and has multiple borings or openings (2), a rotatable driving shaft (3) being arranged coaxially inside the screen basket (1), with blades (4) being attached to said driving shaft, preferably in rigid connection. The driving shaft is driven, e.g., through a flange (5) with belt drive, using an electric motor (not depicted). The blade diameter is of such relative dimension so as to leave a gap between the blade end and the casing. Depending on geometry, the size of the materials to be shredded may be varied.

At the charging side, the first blades in the casing are smaller in diameter than the following blades, so that the charged material mixture to be separated has a better distribution within the casing.

The casing and the interior rotating shaft with blades are arranged in a box (6) having a charging inlet (7) for the material mixture to be separated, and an outlet (8) at the other end for the plastics remaining in the drum and being conveyed by the rotating blades. In addition, the box (6) has an outlet (9) for the removed paper. For improved removal of the paper, a circumferentially revolving scraper (not depicted) may be provided.

Preferably, the casing as well as driving shaft and blades are made of high-strength and corrosion-resistant material such as stainless steel.

Preferably, the borings (2) or outlets at the periphery of the screen basket (1) have sharp edges (not depicted!) serving for improved defiberization of the shredded paper hurled in outward direction through the boring of the casing against the screen basket (1), the screen basket (1) being supported by the exterior walls of box (6).

The blades are preferably inclined to ensure motion of the particles in axial direction with sufficient residence time in the device. For the plastics mixed fraction from Duales System, for example, inclination angles ranging from 5 to 7 degrees are suitable.

The interior bladed shaft rotates at a speed ranging from 1,000 to 2,000, preferably from 1,200 to 1,800 revolutions/minute, the number of revolutions being adjusted as a function of the material mixture employed. The residence time is from 10 s to 2 min.

The separation effect is improved when the paper is moistened prior to being charged into the separation device, with moisture contents of from 3 to 20% relative to the total mass of paper and plastics having proven useful. Nevertheless, the process according to the invention remains a dry process because in the well-known wet processes, the water content is always more than 50%, preferably more than 70%.

Depending on grain size of the charging material and desired separation level, the outlet size varies between 2 and 7 mm.

The preferred shape of the screen basket (1) is a polygon which may have isosceles or non-isosceles planes. It was found that if the screen basket is composed of polygon-like planes, the separation effect is substantially improved as compared to a cylindrical screen basket.

Figure 2:
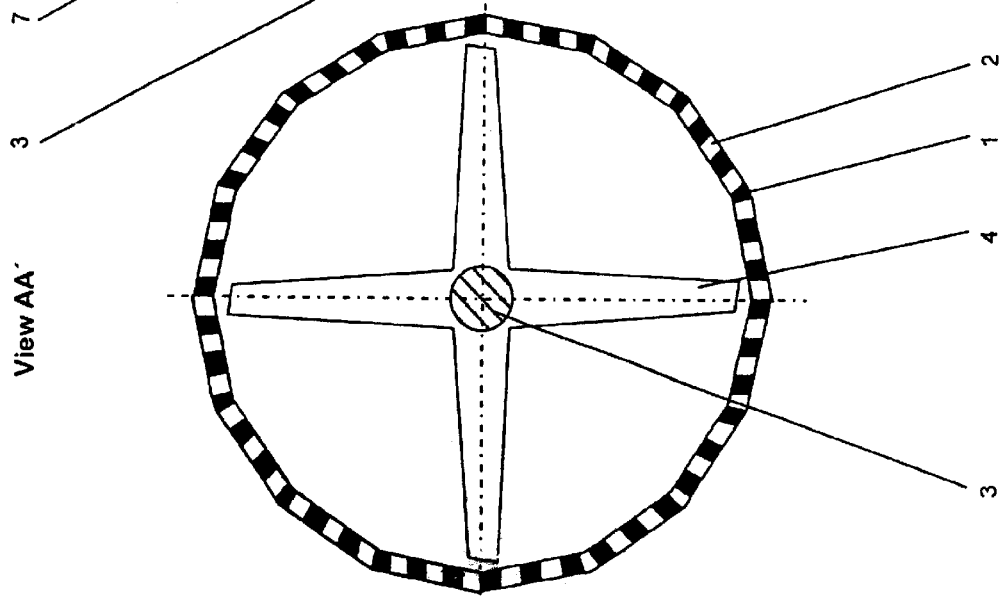
FIG. 2 represents a cross-section through FIG. 1 along the line AA'.

Referring to the appended drawings, the function of process and device will be exemplified, wherein FIG. 1 is a longitudinal section through a device for performing the process, and FIG. 2 represents a cross-section through FIG. 1 along the line AA'.

The solids mixture of plastics and paper is charged through the charging inlet (7) and distributed inside the screen basket by the first blades which have a smaller diameter than the following blades (4). The shaft (3) with blades (4) which is set in rotation by a drive not depicted causes the particles to undergo acceleration and impact which eventually results in accumulation of the defiberized paper at the screen basket (1) and subsequently, discharge through the borings (2). Simultaneously, the plastics migrate in axial direction and are removed through outlet (8). Paper accumulating in the volume defined by box (6) and screen basket (1) is withdrawn via outlet (9), using pneumatic exhaustion (not depicted).

For example, a device according to the invention has the following dimensions: length: 1,500 mm, blade diameter: 950 mm (variable), width of gap between blade ends and casing wall, depending on shape of the casing: 25 mm at maximum, number of blades: 4×11, power input of the device: 50–80 kW; screen basket outlets: 5, throughput: 1 ton per hour.

EXAMPLE

A solids mixture consisting of 90.4% of package foils and 9.6% of coated paper is shredded using a mill with a screen basket having a diameter of 50 mm. There is uniform distribution of the paper within the plastic, and the mixture is dry. After a first run wherein the mixture is passed through the device, the following separation results are obtained:
Results of the First Run:

|  | High-grade fraction (%) | Low-grade fraction (%) |
| --- | --- | --- |
| Yield | 93.5 | 6.5 |
| Paper content | 6.9 | 47.9 |
| Plastics content | 93.1 | 52.1 |

When recharging the high-grade fraction from the above result, the following separation results are obtained:
Results of the Second Run:

|  | High-grade fraction (%) | Low-grade fraction (%) |
| --- | --- | --- |
| Yield | 96.4 | 3.6 |
| Paper content | 4.5 | 71.5 |
| Plastics content | 95.5 | 28.5 |

Thus, in two runs, a total of 57.6% of the charged paper is removed, the yield being 90.1%.

What is claimed is:

1. A process for the dry separation of viscoplastic materials from materials defiberizing under mechanical stress, wherein the materials to be separated are subjected to high acceleration and impact forces in radial, axial and tangential directions, and a mass flow of fibrous material and a mass flow of viscoplastic materials are withdrawn separately, and wherein said viscoplastic materials and said materials defiberizing under mechanical stress are present essentially as composite materials, and only the fibrous material will be defiberized under the action of said forces and separated from the viscoplastic material, the viscoplastic materials being withdrawn in a separate mass flow in an essentially non-shredded state, wherein said high acceleration and impact forces are imparted with a device consisting of a screen basket having borings or outlets in a jacket, allowing the defiberized material to pass through, a rotatable driving shaft being arranged coaxially in an inner zone of the screen basket, with blades being attached to said driving shaft, so that depending on the number of blades, an inclination of the blades and a length of the screen basket only the fibrous material will be defiberized and separated from the viscoplastic material, wherein the screen basket has a cross section in a plane perpendicular to the rotatable driving shaft that is polygonal, and formed by a plurality of planes.

2. The process of claim 1, wherein a mixture of the materials to be separated is roughly shredded to a particle size of ≦50 mm.

3. The process of claim 1, wherein the fibrous material is defiberized in a casing, and the defiberized material is discharged through borings or outlets in a jacket surface of said casing, while the viscoplastic materials remain in the casing, being withdrawn as a separate flow at an end thereof.

4. The process of claim 3, wherein the defiberizing effect is enhanced by sharp edges arranged at the borings or outlets at one interior surface of said casing.

5. The process of claim 3, wherein material flow/transport in said casing results from the direct influence of blades producing radial, axial and tangential acceleration forces.

6. The process of claim 1, wherein said device includes a box having a charging inlet and an outlet in which said screen basket is arranged.

7. A device for the dry separation of viscoplastic materials from materials defiberizing under mechanical stress, consisting of a screen basket having borings or outlets in a jacket, allowing the defiberized material to pass through, a rotatable driving shaft being arranged coaxially in an inner zone of the screen basket, with blades being attached in rigid connection and orthogonal to said driving shaft, so that depending on the number of blades, an inclination of the blades and a length of the screen basket only the fibrous material will be defiberized and separated from the viscoplastic material, the viscoplastic materials being withdrawn in an essentially non-shredded state in a separate mass flow, wherein the screen basket has a cross section in a plane perpendicular to the rotatable driving shaft that is polygonal, and formed by a plurality of planes.

8. The device of claim 7, wherein said blades are attached to said driving shaft at an inclination angle of 5–7 degrees, wherein said inclination angle is an angle between a fixed reference line in said blade profile and a plane which is orthogonal to said driving shaft.

9. The device of claim 7, wherein said blades near a charging side are smaller in diameter than said blades near a discharging side.

10. The device of claim 7, wherein said blades are arranged on the driving shaft in such way as to leave a gap between blade ends and the screen basket.

11. The device of claim 7, wherein said screen basket with interior rotatable driving shaft and blades is arranged in a box having a charging inlet at a charging side for the mixture of materials to be separated, and an outlet at another end for the plastics remaining in the drum and being conveyed by the rotating blades.

12. The process of claim 7, wherein said device includes a box having a charging inlet and an outlet in which said screen basket is arranged.

13. The device of claim 7, wherein said blades are attached to said driving shaft at such an inclination angle to ensure motion of said materials to be separated in an axial direction.

14. A process for the dry separation of viscoplastic materials from materials defiberizing under mechanical stress, wherein the materials to be separated are subjected to high acceleration and impact forces in radial, axial and tangential directions, and a mass flow of fibrous material and a mass flow of viscoplastic materials are withdrawn separately, and wherein said viscoplastic materials and said materials defiberizing under mechanical stress are present essentially as composite materials, and only the fibrous material will be defiberized under the action of said forces and separated from the viscoplastic material, the viscoplastic materials being withdrawn in said mass flow in an essentially non-shredded state, wherein said high acceleration and impact forces are imparted with a device consisting of a screen basket having borings or outlets in a jacket, allowing the defiberized material to pass through, the borings at one interior surface of the screen basket having sharp edges to enhance the defiberizing effect, a rotatable driving shaft being arranged coaxially in an inner zone of the screen basket, with blades being attached to said driving shaft, so that depending on the number of blades, an inclination of the blades and a length of the screen basket only the fibrous material will be defiberized and separated from the viscoplastic material, the viscoplastic materials being withdrawn in an essentially non-shredded state in a separate mass flow, wherein the screen basket has a cross section in a plane perpendicular to the rotatable driving shaft that is polygonal, and formed by a plurality of planes.

15. The process of claim 14, wherein a mixture of the materials to be separated is roughly shredded to a particle size of ≦50 mm.

16. The process of claim 14, wherein the fibrous material is defiberized in a casing, and the defiberized material is discharged through borings or outlets in a jacket surface of said casing, while the viscoplastic materials remain in the casing, being withdrawn as a separate flow at an end thereof.

17. The process of claim 16, wherein the defiberizing effect is enhanced by sharp edges arranged at the borings or outlets at one interior surface of said casing.

18. The process of claim 16, wherein material flow/transport in said casing results from the direct influence of blades producing radial, axial and tangential acceleration forces.

19. The process of claim 14, wherein said device includes a box having a charging inlet and an outlet in which said screen basket is arranged.

20. A device for the dry separation of viscoplastic materials from materials defiberizing under mechanical stress, consisting of a screen basket having borings or outlets in a jacket, allowing the defiberized material to pass through, the borings at one interior surface of the screen basket having sharp edges to enhance the defiberizing effect, a rotatable driving shaft being arranged coaxially in an inner zone of the screen basket, with blades being attached in rigid connection and orthogonal to said driving shaft, a rotational speed of said blades being adjustable within a range of from 1000 to 2000 rpm, so that depending on the number of blades, an inclination of the blades and a length of the screen basket only the fibrous material will be defiberized and separated from the viscoplastic material, the viscoplastic materials being withdrawn in an essentially non-shredded state in a separate mass flow, wherein the screen basket has a cross section in a plane perpendicular to the rotatable driving shaft that is polygonal, and formed by a plurality of planes.

21. The device of claim 20, wherein said blades are attached to said driving shaft at an inclination angle of 5–7 degrees, wherein said inclination angle is an angle between a fixed reference line in said blade profile and a plane which is orthogonal to said driving shaft.

22. The device of claim 20, wherein said blades near a charging side are smaller in diameter than said blades near a discharging side.

23. The device of claim 20, wherein said blades are arranged on the driving shaft in such way as to leave a gap between blade ends and the screen basket.

24. The device of claim 20, wherein said screen basket with interior rotatable driving shaft and blades is arranged in a box having a charging inlet at a charging side for the mixture of materials to be separated, and an outlet at another end for the viscoplastic materials remaining in the drum and being conveyed by the rotating blades.

25. The process of claim 20, wherein said device includes a box having a charging inlet and an outlet in which said screen basket is arranged.

26. The device of claim 20, wherein said blades are attached to said driving shaft at such an inclination angle to ensure motion of said materials to be separated in an axial direction.

27. A process for the dry separation of viscoplastic materials from materials defiberizing under mechanical stress, wherein the materials to be separated are subjected to high acceleration and impact forces in radial, axial and tangential directions, and a mass flow of fibrous material and a mass flow of viscoplastic materials are withdrawn separately, and wherein said viscoplastic materials and said materials defiberizing under mechanical stress are present essentially as composite materials, and only the fibrous material will be defiberized under the action of said forces and separated from the viscoplastic material, the viscoplastic materials being withdrawn in a separate mass flow in an essentially non-shredded state, wherein said high acceleration and impact forces are imparted with a device consisting of a screen basket having borings or outlets in a jacket, allowing the defiberized material to pass through, the borings at one interior surface of the screen basket having sharp edges to enhance the defiberizing effect, a rotatable driving shaft being arranged coaxially in an inner zone of the screen basket, with blades being attached to said driving shaft, a rotational speed of said blades being within a range of from 1000 to 2000 rpm, so that depending on the number of blades, an inclination of the blades and a length of the screen basket only the fibrous material will be defiberized and separated from the viscoplastic material, wherein the screen basket has a cross section in a plane perpendicular to the rotatable driving shaft that is polygonal, and formed by a plurality of planes.

28. The process of claim 27, wherein a mixture of the materials to be separated is roughly shredded to a particle size of $\leq 50$ mm.

29. The process of claim 28, wherein material flow/transport in said casing results from the direct influence of devices producing aid radial, axial and tangential acceleration forces.

30. The process of claim 27, wherein the fibrous material is defiberized in a casing, and the defiberized material is discharged through borings or outlets in a jacket surface of said casing, while the viscoplastic materials remain in the casing, being withdrawn as a separate flow at an end thereof.

31. The process of claim 27, wherein said device includes a box having a charging inlet and an outlet in which said screen basket is arranged.

32. A device for the dry separation of viscoplastic materials from materials defiberizing under mechanical stress, consisting of a screen basket having borings or outlets in a jacket, allowing the defiberized material to pass through, the borings at one interior surface of the screen basket having sharp edges to enhance the defiberizing effect, a rotatable driving shaft being arranged coaxially in an inner zone of the screen basket, with blades being attached in rigid connection and orthogonal to said driving shaft, a rotational speed of said blades being within a range of from 1000 to 2000 rpm, so that depending on the number of blades, an inclination of the blades and a length of the screen basket only the fibrous material will be defiberized and separated from the viscoplastic material, the viscoplastic materials being withdrawn in an essentially non-shredded state in a separate mass flow, wherein the screen basket has a cross section in a plane perpendicular to the rotatable driving shaft that is polygonal, and formed by a plurality of planes.

33. The device of claim 32, wherein said blades are attached to said driving shaft at an inclination angle of 5–7 degrees, wherein said inclination angle is an angle between a fixed reference line in said blade profile and a plane which is orthogonal to said driving shaft.

34. The device of claim 32, wherein said blades near a charging side are smaller in diameter than said blades near a discharging side.

35. The device of claim 32, wherein said blades are arranged on the driving shaft in such way as to leave a gap between blade ends and the screen basket.

36. The device of claim 32, wherein said screen basket with interior rotatable driving shaft and blades is arranged in a box having a charging inlet at a charging side for the mixture of materials to be separated, and an outlet at another end for the plastics remaining in the drum and being conveyed by the rotating blades.

37. The device of claim 32, wherein said blades are attached to said driving shaft at such an inclination angle to ensure motion of said materials to be separated in an axial direction.

38. The device of claim 32, wherein said device further comprises a box having a charging inlet and an outlet in which said screen basket is arranged.

* * * * *